United States Patent [19]

Aloupis

[11] 4,166,761
[45] Sep. 4, 1979

[54] FUSION CHAMBER

[76] Inventor: Harry Aloupis, 515 N. Pollard St., Arlington, Va. 22203

[21] Appl. No.: 875,983

[22] Filed: Feb. 7, 1978

[51] Int. Cl.² .............................................. G21B 1/00
[52] U.S. Cl. .......................................... 176/7; 176/1; 313/231.3; 315/111.7
[58] Field of Search ................. 176/1, 3, 7; 315/111.7; 313/231.3

[56] References Cited

U.S. PATENT DOCUMENTS

| 3,652,393 | 3/1972 | Kaiser | 176/1 |
| 3,764,466 | 10/1973 | Dawson | 176/1 |

FOREIGN PATENT DOCUMENTS 2440921  3/1976  Fed. Rep. of Germany .............. 176/1

OTHER PUBLICATIONS

Nucleonics, 6/63, p. 108.

*Primary Examiner*—Harvey E. Behrend
*Attorney, Agent, or Firm*—Shlesinger, Arkwright, Garvey & Dinsmore

[57] ABSTRACT

A fusion chamber is provided with an inner energy envelope by a hollow laser beam which travels the length of the chamber. A light energy dispersion element disposed at the far end of the chamber reflects the light energy of the laser beam to the inner reflective walls of the chamber and back through the plasma.

8 Claims, 4 Drawing Figures

FUSION CHAMBER

BACKGROUND OF INVENTION

This invention relates to fusion chambers for high energy plasmas which are contained by magnetic fields. It is particularly directed to the use of a laser beam to provide additional heat input and an additional restraining envelope.

The possibilities of obtaining energy by fusion techniques have been under investigation for many years. To date, it has not been possible to heat plasma to the required energy level, while successfully containing it within a magnetic field container. This invention is directed to these limitations.

SUMMARY OF INVENTION

Accordingly, it is a feature of this invention to heat ionic plasma with a variable intensity energy source.

It is a further feature of this invention to provide an arrangement in which laser energy can be used to both supply energy and to assist in containing high frequency heated plasma.

It is a further object of this invention to provide a fusion chamber in which the size of the magnetic envelope can be varied.

It is a still further feature of this invention to provide a container such that laser energy can be used to provide additional energy.

It is a still further object of this invention to provide a laser beam and energy container arrangement such that laser energy can be used to assist in containing heated plasma.

A still further feature of this invention is the provision of a deflection coil assembly which minimizes escape of ions from the inner high energy plasma.

DESCRIPTION OF THE INVENTION

Figure 1:
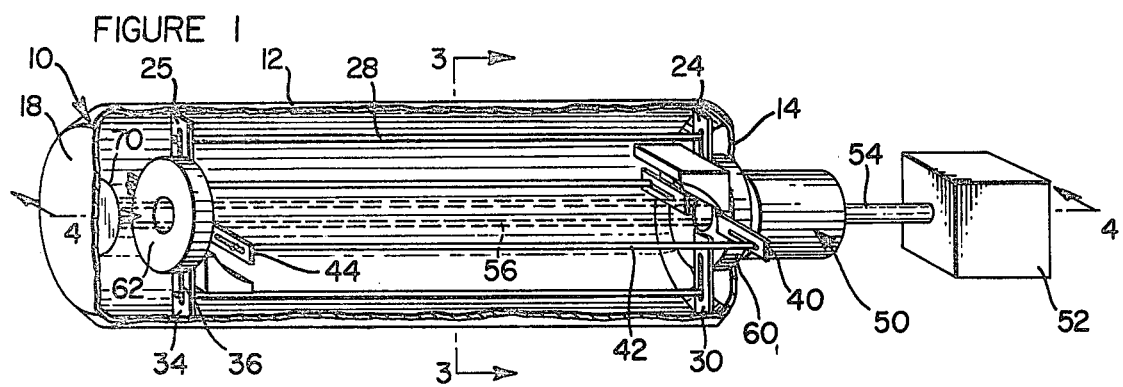
FIG. 1 is a cut-away view showing the entire magnetic fusion assembly.
Figure 4:
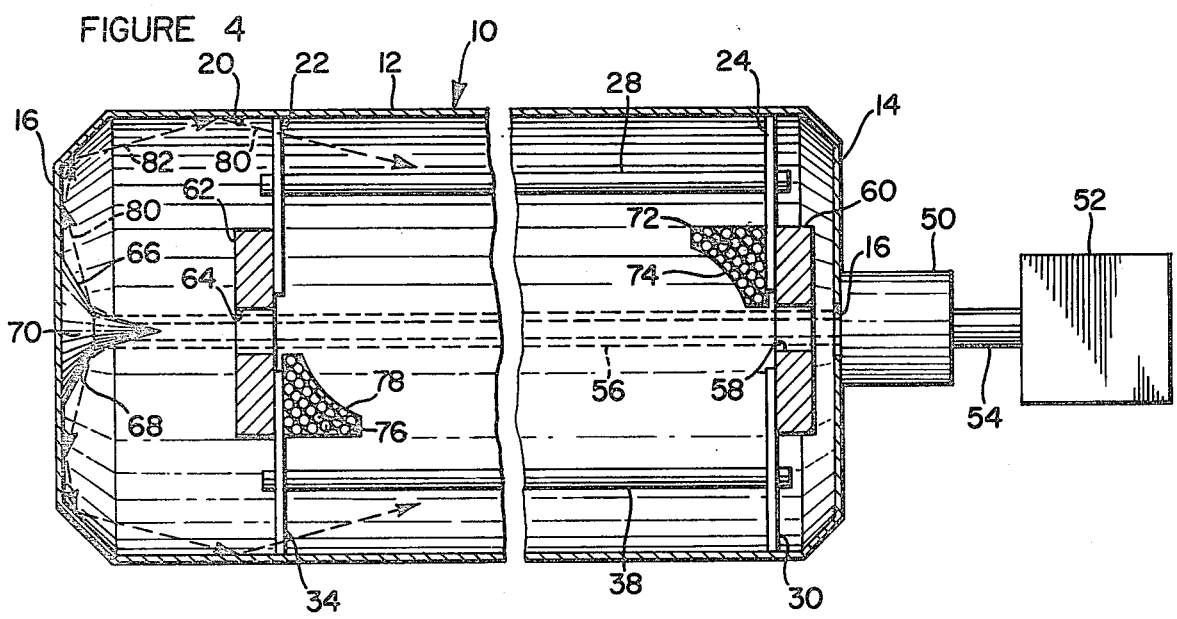
FIG. 4 is an enlarged cross-sectional view of the fusion chamber.

Referring particularly to the drawings, the fusion chamber 10, shown in FIGS. 1 and 4, has a cylindrical container wall 12 having a near end wall 14 with a central opening 16 and a far end wall 18. The container is sealed and is evacuated by any one of a number of different type of vacuum producing systems. The entire inner surface of the container has a highly reflective inner surface and is indicated at 20. The outer shell of the container is heavily insulated with heat shielding material.

The magnetic containing assembly disposed within the container consists of a plurality of heavy conductive bars which are radially adjustable. As can be seen in the drawings, and particularly with respect to FIGS. 1 and 4, the assembly consists of an upper far conductor bar support 22 and an upper near bar support 24, the latter being disposed relatively close to the near wall 14 of the container. Each of the support bars has a slot such as slot 26 in which the conductor bar 28 can be moved radially with respect to the axis of the cylindrical container. The mechanical method employed for this is not shown, and can be accomplished in any one of several ways, including a simple lock nut assembly.

Similarly, the lower conductor bar support 30 adjacent near end wall 14, has a central slot 32, while the opposed lower conductor bar support 34, which is of similar construction, has a slot 36 in which the conductor bar 38 is disposed parallel to the central axis of the container and to conductor bar 28. The support members of the assembly, such as support bars 22, 24, 30 and 34 are integrally connected to the cylindrical wall 12 of the fusion container.

The conductor bars are arranged in symetrical fashion with respect to the central axis to provide a peripheral magnetic field which acts as the container for the plasma. In the embodiment shown, four such bars are employed.

Side support bar 40 supports the conductor bar 42 parallel to the axis with the side bar support member 44. Diametrically opposite to bar 24, support bar 46 supports conductor bar 48.

Adjacent the near end wall 14, a cylindrical laser beam generator 50 disposed adjacent the central opening 16.

Any type of hydrogen ion source can be employed and positioned adjacent the container. In this modification the ion generator 52 is shown in line with the cylindrical beam laser and is connected thereto by the closed hollow member 54.

The cylindrical generator beam laser 50 produces a hollow beam 56 which passes through near end wall 14 at the hollow central opening 16 and then through the central opening 58 of mirror coil 60. It passes along the central axis of the fusion container 10 reaching the far end mirror coil 62 and passes through its central opening 64.

The laser beam must be dispersed at this point. A laser bean dispersion element having tapered side wall 68 adjacent its apex and a secondary tapered wall adjacent and attached to the far end wall 16 of the fusion container disperses the laser beam.

With this construction, there is a possibility of plasma loss adjacent the ends of the magnetic conductor bars. Grouped straight conductors 72 having an inner concave surface 74 are employed adjacent the near end wall 14 of the container to prevent this. A greater concentration of conductors at the central section of the deflection assembly produces a greater magnetic repulsing field, while the end portions which are of less width produces a smaller force field. High current is passed through all of the conductor bars 72.

The specific electrical connection for this is not shown, and can be effected in a number of different manners. One simple arrangement would be the connection of all the conductor bars or cables to a common bus at each end of the assembly, one of which is connected to the positive and the other the negative of a high energy and current source.

At the opposite end of the fusion container, the deflection coils assembly containing plural bar conductors 76 having a concave inner surface 78 performs the same function to restrain particles that might escape at the other end of the magnetic envelope.

At the far end of the fusion chamber, the hollow laser beam on striking the dispersion element upper conical surface 68 is reflected at a shallow angle and strikes the lower outwardly flared surface 70 also at a shallow angle. The path of the reflected beam is shown at 80. The dispersion element has highly reflective surfaces designed to reflect as much light and energy as possible.

The deflected and dispersed laser beam after leaving the dispersion element then strikes the far end wall inner reflective surface at a shallow angle from which it moves to the tapered reflecting section 82 of the fusion chamber housing. From there, it is reflected to the inner light reflecting surface 20 of the central cylindrical section 12 of the housing, which it leaves at a shallow angle traveling back toward the center of the chamber. It should be noted that the fusion chamber is of considerable length and that the reflected laser energy will travel back toward and along the hollow laser beam 56 crossing at a very shallow angle and thus adding additional energy to the central portion of the plasma section. The laser energy thus is conserved to a high degree, and no damage to the surfaces is sustained because of the shallow angles of the deflection system.

The fusion chamber is typically fifteen to twenty meters in length and one meter in diameter. The chamber wall itself is made of metal and is provided with a reflective shiny interior surface 20. The chamber is evacuated as much as possible, possibly as much as to $1 \times 10^{-10}$ atmospheres.

Figure 2:
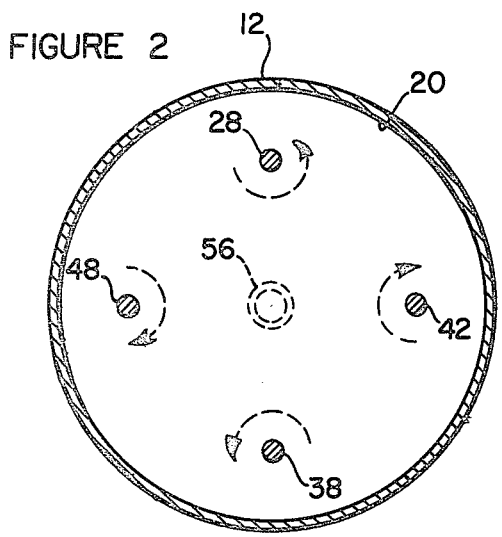
FIG. 2 is a cross-sectional section illustrating the energy relationships of the fusion chamber.
Figure 3:
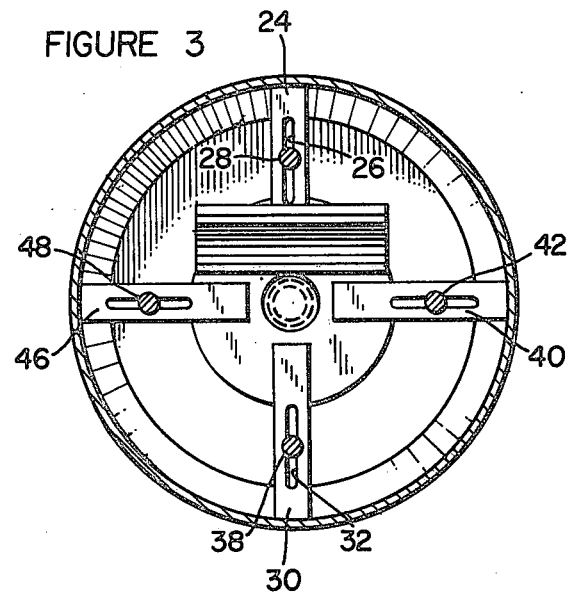
FIG. 3 is a cross-sectional view of the fusion chamber along lines 3—3 of FIG. 1.

As to the containing electrical field, the longitudinally extending conductor bars provide this when they are supplied with electrical energy. FIG. 2 illustrates the relative direction of the fields generated by the bars, and it should be noted that adjacent bars have current running through them in opposite directions.

The inner core within the hollow laser beam contains the higher energy plasma which is heated by both the force field and the laser beam 56. Laser beam energy which passes through to the far end of the chamber is not lost inasmuch as it is reflected as indicated at 80 and passes back toward the center portion of the chamber.

While this invention has been described, it will be understood that it is capable of further modification, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A fusion chamber, comprising:
   (a) a closed elongated evacuated container for ion plasma having an inner highly reflective surface
   (b) magnetic restraining means disposed along the length of the container forming a central container energy shell for holding the plasma within its bounds
   (c) a hydrogen ion source for supplying ions to the container
   (d) a laser beam generator assembly disposed at one end of the container for producing a hollow laser beam which extends along the length of the container to provide an inner energy shell, and
   (e) laser beam dispersion means disposed in line with the laser and at the other end of the container for receiving and deflecting the beam therefrom and toward the inner reflective surface of the container.

2. The fusion chamber as set forth in claim 1, wherein:
   (a) the dispersion means includes a member which has reflective surfaces disposed at a sharp angle with the beam and upon which it impinges.

3. The fusion chamber as set forth in claim 2, wherein:
   (a) the dispersion means includes a dispersal cone, the peak of which faces the laser beam generator assembly.

4. The fusion chamber as set forth in claim 1, wherein:
   (a) magnetic deflection means is disposed along and outside the path of the laser beam and immediately adjacent thereto for confining the plasma.

5. The fusion chamber as set forth in claim 4, wherein:
   (a) the magnetic deflecting means consists of a group of conductors arranged such that in cross section they present a variable thickness and generate a variable strength field.

6. The fusion chamber as set forth in claim 1, wherein:
   (a) a mirror coil is disposed within the container and at each end thereof immediately adjacent the laser beam generator assembly at one end and the laser beam dispersion means at the other end.

7. The fusion chamber as set forth in claim 1, wherein:
   (A) the magnetic restraining means includes a plurality of elongated movable current conducting bars disposed within the container and extending along the length thereof in circumferentially spaced arrangement concentric and spaced from the path of the hollow laser beam.

8. The fusion chamber as set forth in claim 7, wherein:
   (a) the current conducting bars are radially adjustable with respect to the path of the hollow laser beam.

* * * * *